United States Patent [19]
Glatt et al.

[11] Patent Number: 5,870,135
[45] Date of Patent: *Feb. 9, 1999

[54] IMAGE SPLITTING FORMING AND PROCESSING DEVICE AND METHOD FOR USE WITH NO MOVING PARTS CAMERA

[75] Inventors: Terry Laurence Glatt, Pompano Beach; Steven W. Schieltz; Carl Kupersmit, both of Palm Beach County, all of Fla.

[73] Assignee: Sensormatic Electronics Corporation, Deerfield Beach, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 893,930

[22] Filed: Jul. 15, 1997

Related U.S. Application Data

[63] Continuation of Ser. No. 508,057, Jul. 27, 1995, abandoned.

[51] Int. Cl.⁶ .................................................. H04N 7/18
[52] U.S. Cl. ................................................. 348/39; 348/61
[58] Field of Search .................................. 348/36, 39, 38, 348/37, 143, 152, 61; H04N 7/18

[56] References Cited

U.S. PATENT DOCUMENTS

| | | | |
|---|---|---|---|
| 4,323,925 | 4/1982 | Abell et al. ............................. | 348/340 |
| 5,016,109 | 5/1991 | Gaylord .................................. | 348/218 |
| 5,130,794 | 7/1992 | Ritchey .................................... | 348/39 |
| 5,444,478 | 8/1995 | LeLong et al. .......................... | 348/39 |
| 5,489,940 | 2/1996 | Richardson et al. .................... | 348/315 |
| 5,497,188 | 3/1996 | Kaye ........................................ | 348/36 |
| 5,508,734 | 4/1996 | Baker et al. ............................. | 348/36 |

*Primary Examiner*—Bryan Tung
*Attorney, Agent, or Firm*—Robin, Blecker & Daley

[57] ABSTRACT

A video surveillance system has a camera equipped with a fisheye lens having a substantially hemispheric field of view. The system implements operations equivalent to the panning, tilting and zooming of a conventional camera without the use of moving parts. The lens is mounted vertically above a plane under surveillance. The camera produces a fisheye image made up of a plurality of pixels. The fisheye image is distorted due to the properties of the fisheye lens. The system corrects the distortion by mapping the pixels of the fisheye image to coordinates produced by selecting a particular part of the fisheye image to be viewed. This allows an operator to select parts of the field of view of the fisheye lens and view them as if they had been produced by a camera having a conventional lens being panned tilted or zoomed. The fisheye image formed by the camera is split into four separate image components carried by four bundles of optical fibers. Each bundle has a CCD and associated image processing circuitry which forms an electronic representation of the image component carried by that bundle.

17 Claims, 4 Drawing Sheets

IMAGE SPLITTING FORMING AND PROCESSING DEVICE AND METHOD FOR USE WITH NO MOVING PARTS CAMERA

This is a continuation application under 37 CFR 1.62 of prior application Ser. No. 08/508,057, filed Jul. 27, 1995, now abandoned.

BACKGROUND OF THE INVENTION

1. Field of the Invention

This invention relates generally to the field of video surveillance systems. More specifically, it relates to an image forming and processing device including a fisheye lens having a substantially hemispherical field of view. The invention allows an operator to view a selected part of the image formed by the fisheye lens as if it were formed by a normal lens by simulating the panning, tilting or zooming of the normal lens. This allows the operations of panning, tilting and zooming to be implemented without the use of moving parts.

2. Description of Related Art

Surveillance cameras are commonly used to monitor areas of retail stores, factories, airports and the like. In order to use a single camera to survey a large area, the camera is typically provided with mechanisms to enable it to pan, tilt and zoom. Such mechanisms increase the complexity and hence the cost of the camera and can also adversely affect its reliability. Due to the presence of moving parts, mechanical pan, tilt and zoom devices are subject to damage and degradation brought on by extremes of temperature, moisture and dust. In addition, such mechanical systems consume relatively large amounts of power. A surveillance camera capable of panning, tilting and zooming without the use of moving parts would therefore provide significant advantages over existing surveillance cameras.

In U.S. Pat. No. 5,185,667, Zimmermann proposes such a camera having no moving parts. In the device specified in that patent, a fisheye lens is coupled to a video camera such that the camera produces an electronic image. Due to the characteristics of the fisheye lens, the image is distorted. The distortion in the image is corrected by means of an algorithm.

One of the limitations of the system proposed by Zimmermann is that the camera is unable to provide sufficient resolution for effective zooming. Since a fisheye lens renders a distorted image of an entire hemisphere, parts of the image, especially at its peripheries are distorted. The image is formed on a change coupled device (CCD) having a limited number of pixels. In order to view the image as a normal (non-distorted) image, it is necessary to transform the image electronically. The limited number of pixels in the CCD causes the transformed image to be poorly resolved. In order to provide acceptable resolution, a CCD made of approximately 156,000,000 would be needed.

The best available CCD's have approximately 16,000,000 pixels (4,000×4,000) and operate at clocking rates of the order of 10 Mhz. However, in order to satisfy the NTSC sampling rate of 30 samples per second, a clocking rate of 480 MHz is needed. Thus, the type of resolution required for an NTSC picture with the desired magnification cannot be achieved using the prior art.

In U.S. Pat. No. 5,200,818, Neta et al. describe a system in which a wide angle scene is monitored by means of a plurality of sensor arrays mounted on a generally hemispherical surface. Each sensor array has its own lens system. This allows a wide field to be monitored without the need for moving parts to effect panning and tilting. The resolution of the system would be relatively high due to the plurality of sensor arrays. However a system such as that described by Neta et al. would be very costly to implement due to the large number of high quality components needed.

It is an object of the present invention to provide a surveillance camera apparatus, having a substantially hemispherical field of view and capable of effecting the operations of panning, zooming and tilting without the use of moving parts, while still providing sufficient resolution to allow the desired magnification.

It is a further object of the invention to provide a surveillance camera apparatus, having a substantially hemispherical field which allows an operator to view parts of the field of view as if they were acquired by a camera having a conventional lens and being capable of panning, tilting and zooming.

These and other advantages are achieved by the invention described herein.

SUMMARY OF THE INVENTION

The present invention is a an image forming and processing device for use with a video camera. The device comprises a lens having a wide field of view (preferably a fisheye lens). The lens forms a first image having a distortion caused by the lens. An image splitter splits the first image into a plurality of images. At least one image sensor is provided for converting at least one of the plurality of images into an electronic representation. A processor corrects the distortion so that at least part of the first image can be viewed substantially without the distortion. The image splitter preferably comprises a plurality of bundles optical fibers, each bundle of optical fibers transmitting a part of the first image. The image sensor preferably comprises a CCD connected to at least one of the bundles of optical fibers for forming an optical representation of the part of the first image transmitted by that bundle of optical fibers.

DETAILED DESCRIPTION

The following is a description of the preferred embodiment of the present invention. It is intended to be illustrative of the invention and not limiting. The full scope of the invention is to be determined by the appended claims and their equivalents.

Figure 1:
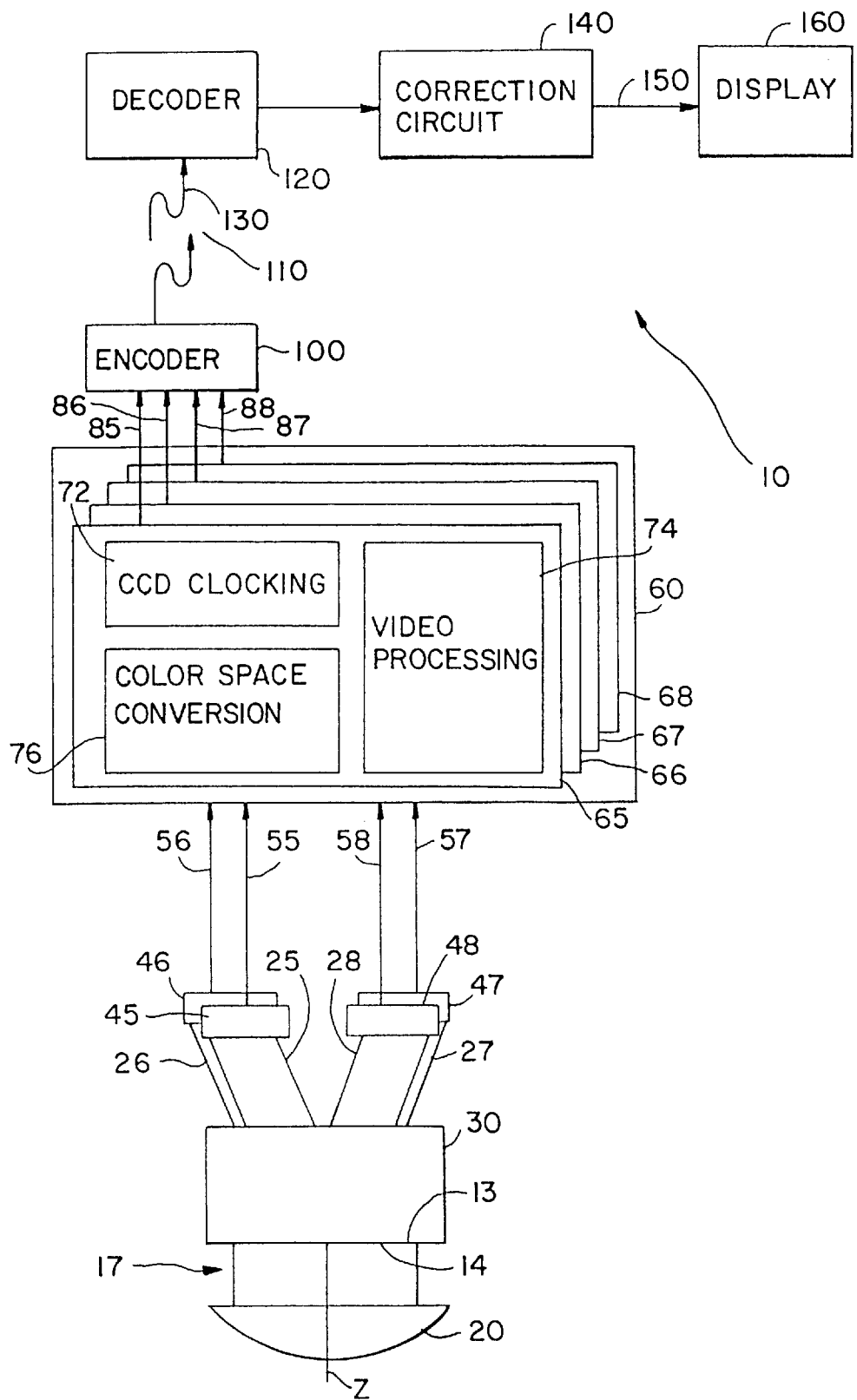
FIG. 1 is a block diagram of a system embodying the invention.

The invention is shown in block diagram form in FIG. 1. Typically the invention is used in the surveillance of premises such as warehouses, stores, bus or train stations and the like. To this end, system 10 is provided with a lens 20 which has a substantially hemispherical field of view, for example a fisheye lens. It is preferable to have an azimuthal view of 180°, a zenithal view of 90° and an infinite depth of field. This produces the desired substantially hemispherical field. The preferred lens is a commercially available equidistant fisheye lens having a focal length of 1.9 mm, and an f stop of 1.8. Lens 20 has a primary axis Z and forms a circular image 14 on image plane 13.

Figure 2A:
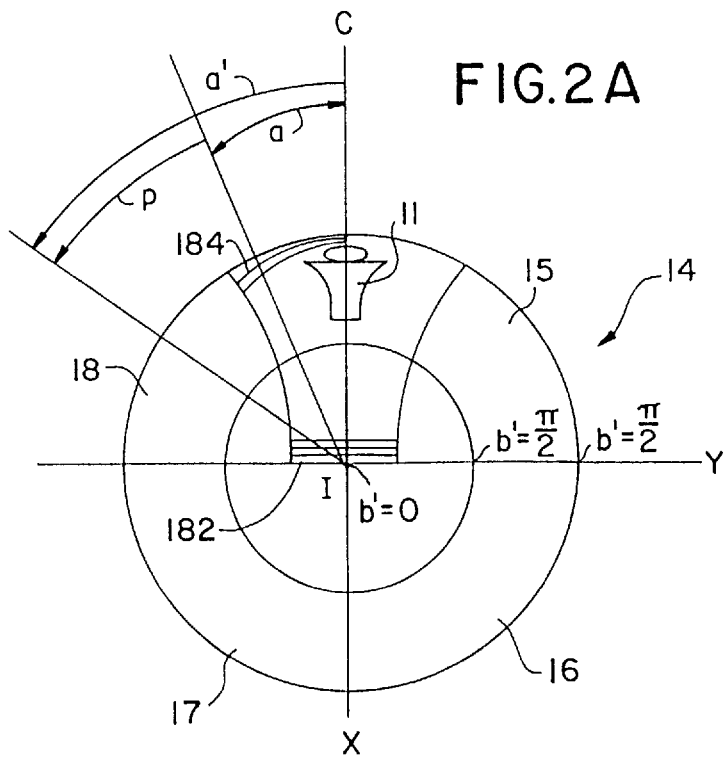
FIG. 2A is a plan view of the image plane of the fisheye lens showing a distorted fisheye image.
Figure 2B:
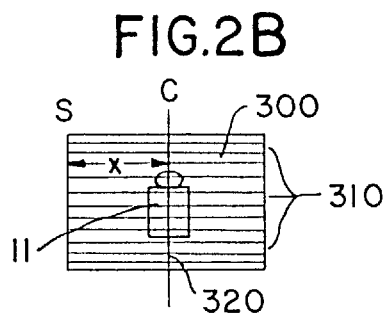
FIG. 2B is a diagram of a selected part of the fisheye image, corrected using the present invention.

Due to the properties of lens 20, image 14 is distorted. Specifically, the orientation of objects in image 14 is altered relative to their real orientation. For example, an object 11 in the field of view of lens 20 (See FIG. 8) will appear on the periphery of image 14 in distorted form as shown in FIG. 2.

Image 14 is preferably split into four separate components by splitter 30. Image 14 could be split into any number of components, depending on the resolution required and the available technology. When image 14 is split into four components, each component respectively contains an image 15, 16, 17 or 18 made up of one quadrant of circular image 14. (See FIG. 2). Splitter 30 is made up of four light conduits 25, 26, 27 and 28. Light conduits 25, 26, 27 and 28 respectively contain coherent fiber optic bundles 35, 36, 37 and 38 (See FIG. 4). Images 15, 16, 17 and 18 are thus respectively carried in conduits 25, 26, 27 and 28 by fiber optic bundles 35, 36, 37 and 38.

Figure 3:
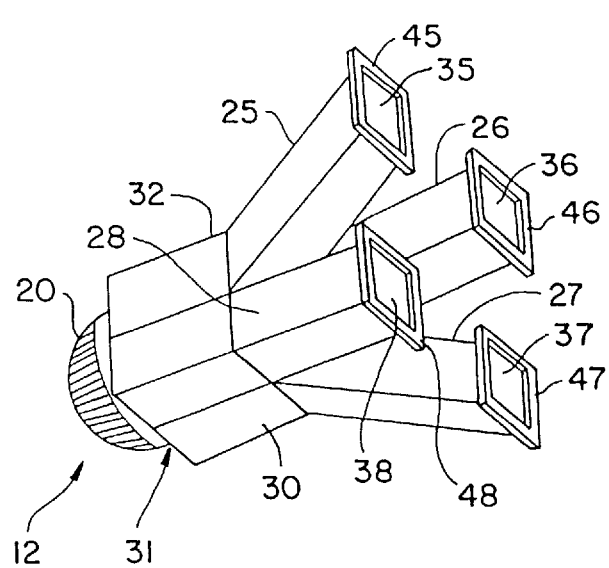
FIG. 3 is a perspective view of the image splitter of the invention.
Figure 4:
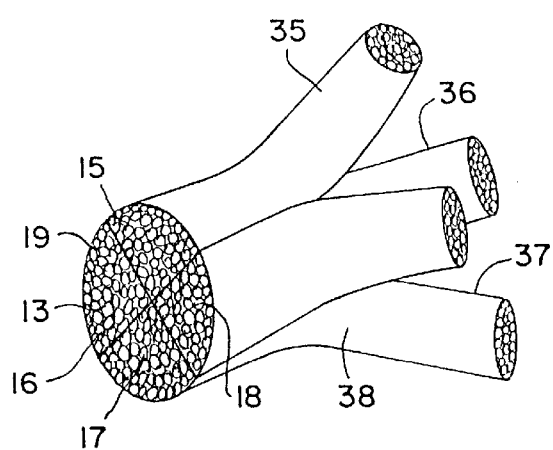
FIG. 4 is a perspective view of the fiber optic bundles in the image splitter.

Splitter 30 is shown in greater detail in FIGS. 3 and 4. Splitter 30 is made up of a housing 32 to which are attached conduits 25, 26, 27 and 28. Optical fiber bundles 35, 36, 37 and 38 housed in conduits 25, 26, 27 and 28 respectively, branch off from a major bundle of fibers, terminating at image plane 13 in a polished surface. See FIG. 4. Optical fiber bundles 35, 36, 37 and 38, are each made up of a plurality of optical fibers. Each optical fiber carries a sample of image 14 formed by fisheye lens 20 and has a diameter of approximately 10 µm.

Images 15, 16, 17 and 18 respectively travel along each of conduits 25, 26, 27 and 28 and impinge respectively upon sensors 45, 46, 47 and 48. Sensors 45, 46, 47 and 48 are 768×480 CCD's with fiberoptic windows formed from a fiberoptic faceplate which allows for direct coupling of the CCD's to the optical fibers. Suitable fiberoptic faceplates are available from Galileo Electro-optics Corporation of Sturbridge, Mass. under the name "CP Series." Images 15, 16, 17 and 18 are respectively converted by the sensors into representative electrical signals 55, 56, 57 and 58.

Signals 55, 56, 57 and 58 are fed into CCD control processor 60 which is made up four identical off the shelf video camera sensor image controllers 65, 66, 67 and 68, each corresponding respectively to one of signals 55, 56, 57 or 58. Each of the control processors contains a CCD clocking circuit 72, a video processing circuit 74 and a color space converter 76. Color space conversion circuit 76 produces chrominance and luminance signals Cr, Cb and Y for each signal 55, 56, 57 and 58.

Control processors 65, 66, 67 and 68 respectively produce video outputs 85, 86, 87 and 88 in the form of luminance and chrominance components suitable for compression by encoder 100. Compression of the video signals 85, 86, 87 and 88 allows a very large number of image samples to be transmitted over a channel having limited bandwidth. The video outputs are therefore compressed if the lens is at a location remote from correction circuit 140. Encoder 100 compresses the video signals 85, 86, 87 and 88 by compressing them in accordance with a compression scheme, for example, MPEG or H. 261. Alternatively, a sub-band coding scheme can be used. Encoder 100 packetizes the video signals into a serial data stream for transmission over high speed network 110 such as coaxial cable or optical fibers. The compressed video signals are received by decoder 120 which performs a transform on the compressed video signals which is the inverse of the transform performed by encoder 100.

Decoder 120 produces a decoded video signal 130 which is fed into correction circuit 140. The purpose of correction circuit 140 is to correct the distortion introduced by fisheye lens 20. This correction is performed in accordance with the algorithm described below. Correction circuit 140 produces a corrected signal 150 which is displayed on display 160.

The following is a description of the system for correcting the fisheye distortion of image 14. For the sake of simplicity, it will be assumed that the entire fisheye image 14 is formed on the surface of a single CCD 180 and that splitter 30 is not used. CCD 180 has axes X and Y. Lens 20 is mounted at a mounting point 17 vertically above surveillance plane 19, preferably such that principal axis Z is perpendicular to surveillance plane 19. Surveillance plane 19 is the floor of a room 15. Mounting point 17 is on the ceiling of room 15. Axes X, Y and Z intersect at center point I on the surface of CCD 180. The surface of CCD 180 forms image plane 13 which is parallel to surveillance plane 19.

Mounting the camera and fisheye lens above the surveillance field (i.e. on ceiling rather than on a wall) has several advantages. Firstly, with the camera on the ceiling, the field of view covers a full 360°. This allows the simulation of a pan through 360° rather than a pan range limited by the presence of the wall. In the case of a ceiling mounted lens, the hypothetical (simulated) pan axis is the primary axis Z of the fisheye lens, rather than an axis perpendicular to the primary axis in the case of a wall mounted lens. The angle about the primary axis Z is maintained from the object to the image. This facilitates the calculation of radial coordinates because the pan axis is already in radial form and no conversion is needed.

When any object is viewed on monitor 240, the vertical center line of the image intersects the center point I of the image plane. The primary axis Z of the lens passes through this center point. There is therefore no need to rotate the images to view them in their correct orientation. In the correction algorithm set forth in U.S. Pat. No. 5,185,667, rotation of the image is separately calculated. Such a separate operation is not needed with the present invention.

When the lens is placed on a wall, objects of interest and objects which are furthest away tend to be at the center of the fisheye image. The greatest resolution is needed to view the details of those objects. When the fisheye lens is placed vertically above the surveillance plane, objects in the center are usually closest to the lens. Viewing of such objects does not require high resolution and those objects are the least distorted. Objects which are furthest away from the lens appear at the peripheries of the fisheye image. However, the image formed by a fisheye lens has a higher density and therefore a lower CCD image resolution at the center than at its peripheries. Consider a part of a fisheye image having a radius of "R." The density of the pixels in the CCD on which the image is formed is uniform. Along a line passing through the center of the CCD, the image is spread over 2R pixels. At the circumference of the image, the image is spread over πR (half the circumference)-π/2 more pixels than for objects appearing at the center of the image. Thus placing the lens vertically above the surveillance plane provides far better resolution for distant objects than if the lens is placed perpendicular to the surveillance plane.

Figure 5:
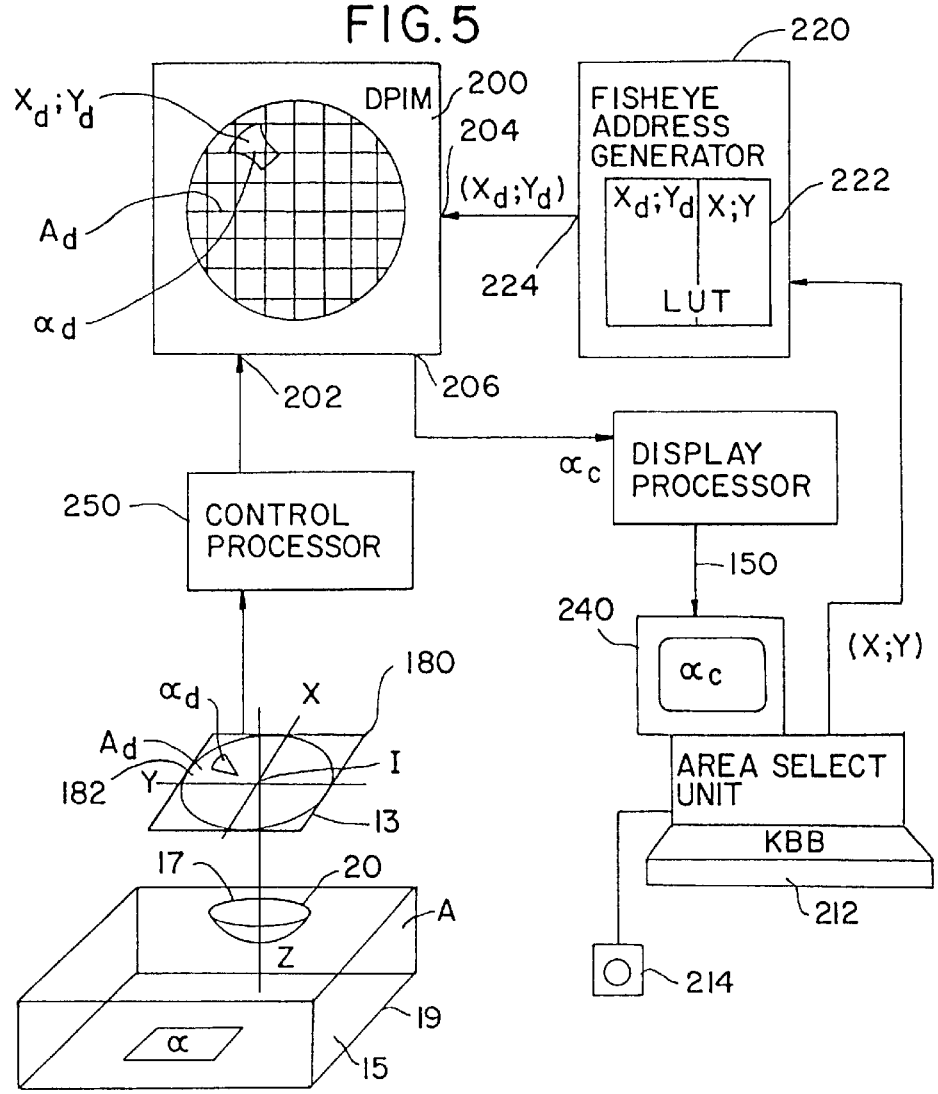
FIG. 5 is a block diagram of the fisheye distortion correction system of the invention.

The following description refers to FIG. 5. Fisheye lens 20 has a 180 degree field of view covering area "A." With lens 20 is mounted on the ceiling of room 15, area A includes the floor and walls of the room. Fisheye lens 20 forms a fisheye image $A_d$ of area A on image plane 13. Any point in area A represented by unique coordinates (x;y), is displaced to point $(x_d;y_d)$ in the fisheye image $A_d$ in accordance with the characteristics of fisheye lens 20. Image plane 13 (the surface of CCD 180) is made up of a matrix comprising a plurality of pixels 182. Each pixel has unique fisheye coordinates. CCD thus produces an electronic representation of area A. This representation is fed into CCD control processor 250 (identical to control processor 60) which produces chrominance and luminance values for each pixel in CCD 180. Those chrominance and luminance values are stored in dual ported image memory ("DPIM") 200. The present invention allows the user to manipulate the fisheye image electronically in order to implement the operations of panning, tilting and zooming. Thus a sub-area α of area A can be examined in detail by the transformation of sub-area $\alpha_d$ of area $A_d$ from a distorted fisheye image into a normal image.

When the system is powered up a default corrected sub-area $\alpha_c$ appears on monitor 240. The user selects sub-area α by means of area select unit 210—a control station having a keyboard and a pointing device. This is done by using pointing device 214 to simulate the panning and a tilting of a hypothetical conventional camera. The image on monitor 240 appears to have been formed by a conventional camera. In reality, it is formed by correction of part of fisheye image 14. The selection of sub-area α provides the normal (non-fisheye) coordinates of an object in the center of sub-area α. This operation simulates the pointing of the primary axis (IC in FIG. 8) of hypothetical conventional camera at the object. The hypothetical camera is mounted at mounting point 17 with its primary axis IC passing through center point I and through the center of sub-area α. Pointing this hypothetical camera by means of input device 214 such that a sub-area α appears on monitor 240 also causes area select unit 210 to generate the pan and tilt angles which would be associated with the hypothetical camera positioned at hypothetical pan and tilt angles so that it points at an object in sub-area α.

When the user selects sub-area α the system automatically converts $\alpha_d$ (the distorted fisheye image of area α) into a corrected image $\alpha_c$. This allows the user to view the sub-area α0 on monitor 240 as if it were formed by the hypothetical (non-fisheye) camera which had been panned and tilted to point at sub-area α.

Each of the pixels in the fisheye image $A_d$ is stored at a unique address in DPIM 200 in the form of the intensity and color data generated by CCD 180 via control processor 250. DPIM 200 thus contains a digital electronic representation of the distorted fisheye image $A_d$ of area A. For any sub-area α of area A, DPIM 200 contains an electronic representation of the corresponding distorted sub-area $\alpha_d$.

Figure 6:
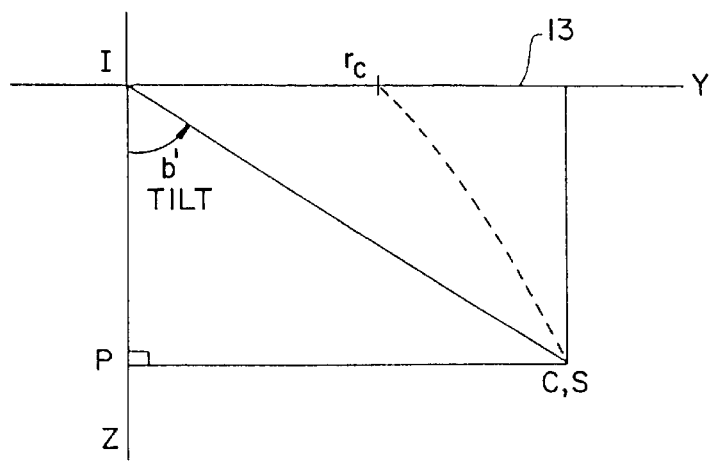
FIG. 6 is a diagram showing the projection of a point C at tilt angle b on the Y axis of the image plane as a result of the fisheye distortion.
Figure 7:
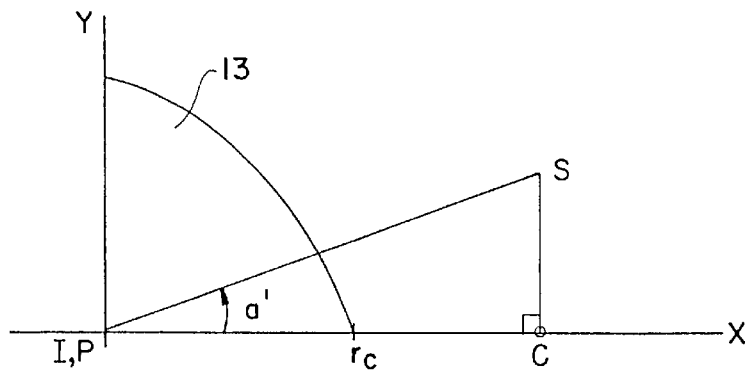
FIG. 7 is a diagram of the image plane X-Y showing the projection of a point C on the image plane.
Figure 8:
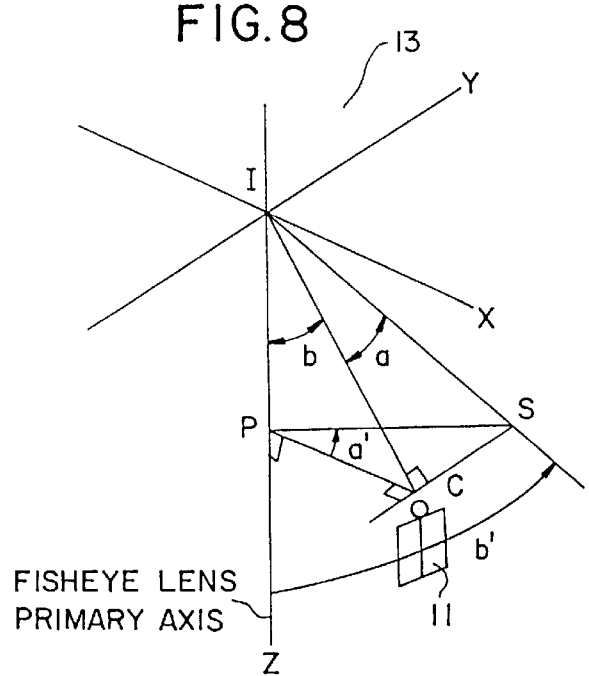
FIG. 8 is a three dimensional diagram showing the primary axis of the fisheye lens, the primary axis of a hypothetical camera panned and tilted to point at point C.

Image plane 13 is the plane formed by the X and Y axes as shown in FIGS. 6, 7 and 8. Primary axis Z of lens 20 is perpendicular to the X and Y axes. If a user wished to view in detail the scene centered around point C (i.e sub-area α-the image shown in FIG. 2B) with a hypothetical non-fisheye lensed camera, the user would instruct the camera to tilt by an angle b relative to the primary axis Z. Doing so would orient the hypothetical camera such that the hypothetical primary axis (center line IC) passes through the center point I of image plane 13 and through point C.

Had it been captured by the hypothetical conventional camera, area α would appear on CCD 180 as an image 300 centered at line 320 and made up of a large number of horizontal lines of pixels 310. (See FIG. 2A). Each pixel on a particular horizontal line is displaced from center line 320 by a particular distance x. That distance corresponds to an angle "a" relative to center line IC (See FIG. 8) or angle a' about primary axis Z.

Each pixel in image 14 can be described by reference to a set of rectangular or polar coordinates. Thus, referring to FIGS. 7 and 8, the pixel at point C on center line IC can be located by reference to polar coordinates in the form of tilt angle b (See FIG. 6) and angle a—the displacement of the pixel from center (for point C, a is equal to zero since C lies on the X axis). Similarly, moving along a horizontal line in CCD 180 (i.e., moving parallel to the Y axis), a pixel at point S can be described by reference to tilt angle b' relative to principle axis Z and pan angle a' relative to center line IC. The corresponding rectangular coordinates are $x_d$ and $y_d$.

Referring again to FIG. 2A, it can be seen that due to the nature of the fisheye lens, the fisheye image is distorted. Objects located close to the principal axis of fisheye lens 20 appear on CCD 180 substantially normally (See area 182), whereas, objects further from the principal axis are progressively more distorted (See area 184). The information carried by a pixel located at point (x;y) in a non-fisheye image will, in the fisheye image, be located at $(x_d;y_d)$, where $(x_d;y_d)$ are displaced from (x;y) by an amount dependent on the properties of fisheye lens 20.

It is a fundamental property of a fisheye lens that the image of a point located at an angle of rotation b' relative to the primary axis will be projected on the image plane a radius r from the primary axis in accordance with the formula:

$$r = f.b'$$

where r is the distance from center point I;

f is a lens constant in mm/radian indicative of the distortion caused by the fisheye lens; and b' is the angle of an incident ray from an object to the primary axis (in radians).

It is also a fundamental property of a fisheye lens that the angle from a point in the field of view to its projection on the image plane is maintained.

These two properties are used to derive a new formula which allows selected parts of the fisheye image to be viewed as if they were formed by a conventional camera panned, tilted or zoomed in on an area of interest in the field of view. This formula relates the pan and tilt angles of a hypothetical camera described above to the rectangular coordinates of a corrected image. The following is a description of how that formula is derived and applied to achieve the objects of the invention.

From FIG. 6 it can be seen that a point C located at a tilt angle b relative to the principal axis of the lens forms an image on image plane IP at a radius $r = r_c$ from center point I. As stated above, for a particular fisheye lens, the relationship between tilt angle b and the radius at which the image of point C forms is:

$$r = f.b \tag{1}$$

In FIG. 8, point C lies in the plane formed by the Y and Z axes and at a tilt angle of b relative to the primary axis Z. The line IC from the center I of the image plane to point C is taken as the primary axis of a hypothetical camera lens pointed at point C. Line CS extends from point C to a point S. CS is parallel to the X axis. CS thus represents a horizontal line of pixels in CCD 180. Consider a pixel at S, at a particular radius r from I, the center of the CCD, and at a pan angle "a'" about the primary axis of the hypothetical camera lens and at a tilt angle b' relative to the primary axis of the fisheye lens. The rectangular coordinates of that pixel are:

$$X = f.b'. \cos(a') \tag{2}$$

$$X = f.b'. \sin(a') \tag{3}$$

Equations (2) and (3) convert the polar coordinates of any particular pixel of the fisheye image formed on CCD to rectangular coordinates. The pixel at point S can therefore be located by reference to tilt angle b' (an angle measured off the principal axis Z) and pan angle a' (the angle of rotation around the principal axis Z).

When the system powers up a default area a is displayed, corresponding to the initial area at which the hypothetical camera is pointing. For convenience, this area lies along the primary axis Z (so the tilt angle b is zero). The pan angle is also zero (i.e., line IC lies along the X axis). The hypothetical camera (with the primary axis of its lens lying along line IC) is then tilted by an angle of "b" relative to the primary axis Z of the fisheye lens so that it points at an object centered at point C. In order to make the operation of the correction system transparent to the user, the panning and tilting of the hypothetical camera is measured relative to the initial position of the hypothetical camera. Thus, the position of a pixel representing a point at S will be expressed in terms of tilt angle "b" and the angle of point S from center line IC—angle "a" the amount of pan from center line IC to point S.

The following is a description of the manner in which the position of a pixel representing point S in the fisheye image can be described by reference to angle a—its displacement from the center line IC and angle b—the tilt angle of a hypothetical normal camera panned and tilted so that it's principal axis is aligned with point C.

Referring to FIG. 8, it is seen that $$\tan(a') = SC/PC$$
$$SC = IS \cdot \sin(a)$$
$$PC = IC \cdot \sin(b)$$
$$IC = IS \cdot \cos(a)$$

$$\text{therefore } \tan(a') = IS \cdot \sin(a)/IS \cdot \cos(a) \cdot \sin(b)$$
$$= \tan(a)/\sin(b)$$

$$a' = \tan^{-1}(\tan(a)/\sin(b)) \tag{4}$$

$$\cos(b') = IP/IS$$
$$IP = IC \cdot \cos(b)$$
$$IC = IS \cdot \cos(a)$$

$$\text{therefore } \cos(b') = IS \cdot \cos(a) \cdot \cos(b)/IS \tag{5}$$
$$= \cos(a) \cdot \cos(b)$$

$$b' = \cos^{-1}(\cos(a) \cdot \cos(b))$$

From equations (2) and (3), for a given fisheye lens, $X_d = fb' \cos(a')$ and $Y_d = fb' \sin(a')$. Substituting the values of a' and b' from equations (4) and (5) into equations (2) and (3):

$$X_d = f \cdot \cos^{-1}(\cos(a) \cdot \cos(b)) \cdot \cos(\tan^{-1}(\tan(a)/\sin(b))) \tag{6}$$

$$Y_d = f \cdot \cos^{-1}(\cos(a) \cdot \cos(b)) \cdot \sin(\tan^{-1}(\tan(a)/\sin(b))) \tag{7}$$

These formulas allow the coordinates of the pixels centered around center line IC to be calculated simply from knowledge of angular coordinates in the form of the tilt angle "b" of a hypothetical camera (a measure of the distance of the point from the center of the fisheye image) and the angle "a" of a pixel relative to center line IC. This formula provides a very simple means for effectuating panning, tilting and zooming from the fisheye image.

To effect panning of the hypothetical camera, pan angle p is added to angle a' to form new angle a". Thus, a"=p+a'. Substituting this into equation (4) gives:

$$a\Delta = p + \tan^{-1}(\tan(a)/\sin 9b)) \tag{8}$$

Substituting equation (a) into equations (6) and (7):

$$X_d = f \cdot \cos^{-1}(\cos(a) \cdot \cos(b)) \cdot \cos(p + \tan^{-1}(\tan(a)/\sin(b))) \tag{9}$$

$$Y_h = f \cdot \cos^{-1}(\cos(a) \cdot \cos(b)) \cdot \sin(p + \tan^{-1}(\tan(a)/\sin(b))) \tag{10}$$

As pointing device 214 is moved to simulate panning and/or tilting of the hypothetical camera, the rectangular coordinates (X;Y) of each pixel in each line of pixels in sub-area a are generated by area select unit 210 and stored in look-up table ("LUT") 222. The system also automatically calculates the coordinates $(X_d;Y_d)$ of the fisheye image from the using equations (9) and (10). For each set of normal coordinates (X;Y) in sub-area a, the calculated coordinates $(X_d;Y_d)$ are stored in LUT 222 as addresses in DPIM 200.

All of the coordinates for the fisheye image could be pre-calculated or only the coordinates for a particular area need be calculated as the area is selected. In either case, the coordinates are stored in LUT 222 and the corresponding pixels are stored in DPIM 200. This allows the pixels corresponding to those calculated coordinates to be fetched from CCD 180. The fetched pixels are then displayed on monitor 240 at locations (X;Y) just as if the image had been formed by the panning and tilting of a normal camera to coordinates (X;Y).

Zooming can be accommodated by varying the amount that angle a i incremented between pixels and the amount b is incremented between rows when calculating the contents of LUT 222. For example, if there are 400 pixels on a horizontal display line and a is incremented from −20° for the left side of the display in steps of 0.1°, a 40° horizontal field of view will result. Likewise, to display a 30° vertical field of view that would correctly maintain the 4:3 aspect ratio of a standard display, the 483 display lines would be obtained by incrementing b by 0.062° between each horizontal display line.

The contents of LUT 222 and DPIM 200 are represented in the following table:

TABLE I

| ADDRESS SEQUENCE FOR BOTH DATA STRUCTURES | FEA GENERATOR LUT CONTENTS | DUAL PORT MEMORY CONTENTS |
|---|---|---|
| Starting Address | Address of 1st pixel of 1st row | 1st pixel 1st row |
| Starting Address + 1 | Add. of 2nd pixel of 1st row | 2nd pixel 1st row |
| . | . | . |

TABLE I-continued

| ADDRESS SEQUENCE FOR BOTH DATA STRUCTURES | FEA GENERATOR LUT CONTENTS | DUAL PORT MEMORY CONTENTS |
|---|---|---|
| . . . | . . . | . . . |
| Starting Address + H | Add. of 1st pixel of 2nd row | 1st pixel 2nd row |
| Starting Address + H + 1 | Add. of 2nd pixel of 2nd row | 2nd pixel 2nd row |
| . . . | . . . | . . . |
| Starting Address + 2H | Add. of 1st pixel of 3rd row | 1st pixel 3rd row |
| Starting Address + 2H + 1 | Add. of 2nd pixel of 3rd row | 2nd pixel 3rd row |
| . . . | . . . | . . . |

H = Number of pixels per line in display processor.

By retaining multiple images in DPIM 200, a historical log of images over time can also be stored. The oldest image is continually overwritten with the current image as the memory capacity is exceeded, thus maintaining a revolving log of images generated over a predetermined time period. Thus, by appropriate selection of an address in DPIM 200 by fisheye address generator, images captured in the preceding predetermined time interval can be displayed when an alarm event occurs (e.g. an intruder attempting to enter the monitored premises and triggering a sensor).

Using a 360 degree image, this system implements the operations of panning and tilting without any moving parts. This increases the reliability of the camera while limiting the cost of acquiring and maintaining it. The invention thus enables the monitoring of a large area by means of a single camera covering a wide field of view.

We claim:

1. An image forming and processing device for use with a video camera, comprising:
   a lens having a wide field of view, the lens forming a first image having a distortion caused by the lens;
   an image splitter for splitting the first image into a plurality of images;
   a selector for selecting a part of one of the plurality of images;
   at least one image sensor, for converting only the selected part of the one of the plurality of images into an electronic representation; and
   a processor responsive to the electronic representation for correcting distortion so that the selected part of the one of the plurality of images can be viewed substantially without the distortion.

2. The image forming and processing device of claim 1 wherein the image splitter comprises a plurality of bundles optical fibers, each bundle of optical fibers transmitting a part of the first image.

3. The image forming and processing device of claim 2 wherein the image sensor comprises a CCD connected to at least one of the bundles of optical fibers for forming an optical representation of the part of the first image transmitted by that bundle of optical fibers.

4. The image forming and processing device of claim 1 wherein the image splitter divides the first image into quadrants.

5. The image forming and processing device of claim 1 wherein the lens is a fisheye lens.

6. The image forming and processing device of claim 1 further comprising compression means for compressing the electronic representation to form a compressed electronic representation.

7. The image forming and processing device of claim 1 wherein the image splitter comprises a plurality of image conduits, each of the image conduits carrying one of the plurality of images.

8. The image forming and processing device of claim 1 wherein the processor is adapted to perform a transformation on the electronic representation, the transformation being equivalent to panning a camera.

9. The image forming and processing device of claim 1 wherein the processor is adapted to perform a transformation on the electronic representation, the transformation being equivalent to tilting a camera.

10. The image forming and processing device of claim 1 wherein the processor is adapted to perform a transformation on the electronic representation, the transformation being equivalent to zooming a lens.

11. A method of monitoring an area, the method of comprising the steps of:
    forming an optical image of substantially the entire area by means of a fisheye lens having a wide field of view, such that the image has a distortion caused by the fisheye lens;
    splitting the optical image into a plurality of sub-images;
    selecting a part of one of the plurality of sub-images;
    converting only the selected part of the one of the plurality of sub-images into an electronic representation; and
    processing the electronic representation, thereby correcting the distortion.

12. The method of claim 11 further comprising the step of compressing the electronic representation to form an encoded electronic representation.

13. The method of claim 12 wherein the step of compressing the electronic representation is performed prior to the step of processing.

14. The method of claim 11 further comprising the step of performing a transformation on the processed electronic representation equivalent to panning a camera.

15. The method of claim 11 further comprising the step of performing a transformation on the processed electronic representation equivalent to tilting a camera.

16. The method of claim 11 further comprising the step of performing a transformation on the processed electronic representation equivalent to tilting a lens.

17. The method of claim 11 further comprising the step of performing a transformation on the processed electronic representation equivalent to zooming a lens.

* * * * *

UNITED STATES PATENT AND TRADEMARK OFFICE
CERTIFICATE OF CORRECTION

PATENT NO. : 5,870,135
DATED : February 9, 1999
INVENTOR(S) : Terry Laurence Glatt, et al.

It is certified that error appears in the above-identified patent and that said Letters Patent is hereby corrected as shown below:

Column 5, line 56, delete "0".
Column 8, line 24, delete "Yh" and insert --Yd--.
Column 8, line 28, delete "a" and insert --$\alpha$--.
Column 8, line 32, delete "a" and insert --$\alpha$--.

Signed and Sealed this

Twenty-second Day of February, 2000

Q. TODD DICKINSON

Attest:

Attesting Officer

Commissioner of Patents and Trademarks